Jan. 16, 1934.   H. B. HOWRY   1,944,146
AIR CONDITIONING APPARATUS
Filed March 16, 1931
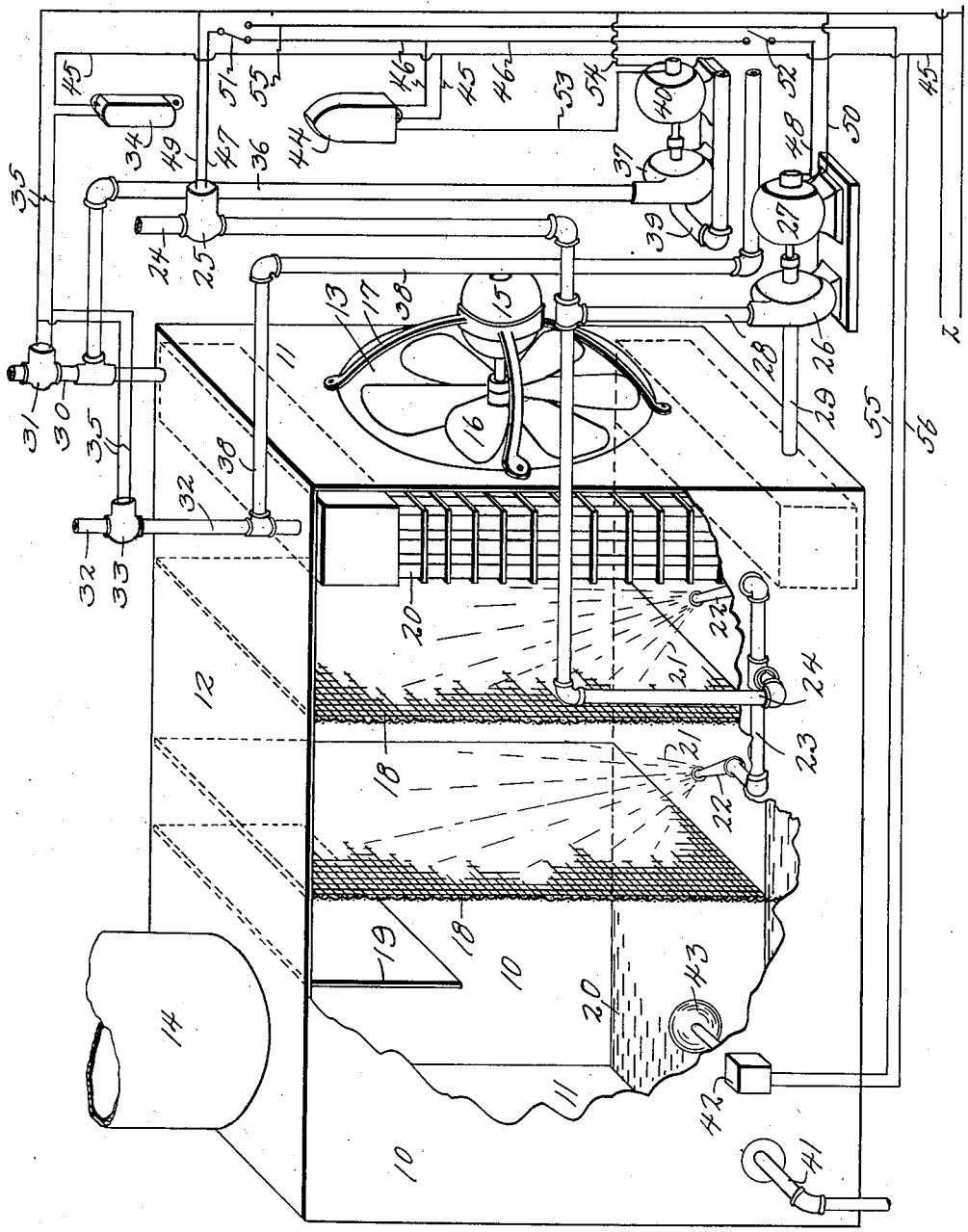
INVENTOR.
Hobart B. Howry
BY
Lynn H. Latta
ATTORNEY Patented Jan. 16, 1934

1,944,146

UNITED STATES PATENT OFFICE 1,944,146

AIR CONDITIONING APPARATUS

Hobart B. Howry, Sioux City, Iowa, assignor, by direct and mesne assignments, to National Air Conditioning Company, Sioux City, Iowa, a corporation of Iowa Application March 16, 1931. Serial No. 523,065

12 Claims. (Cl. 257—3)

This invention relates to air conditioning apparatus adaptable for use in bakeries, grocery stores, dwelling houses, refrigerating rooms, small theaters, and the like.

The primary object of the present invention is to provide an air conditioning apparatus in a relatively small and compact unit. Further, it is my object to provide in such a small, compact unit, apparatus for temperature control and for humidity control under widely varying conditions, such as those met with in the various environments specified above. For instance, different problems arise in conditioning the air of a refrigerating room than those in connection with conditioning the air in a bakery where the temperature is excessively high.

Another object of my invention is to provide a radiating unit which is adapted to serve both as a heating medium and as a de-humidifying agent. For instance, where the apparatus is to be used in connection with dwelling houses where a very even temperature is desirable, the radiator functions in the winter time or when the atmosphere is cool, as a heating medium to either bring the atmosphere from its normal outside temperature to the desired point or to supplement and stabilize the heating effect of the furnace or other heating medium in the dwelling house so as to maintain the temperature uniformly at the exact temperature desired.

Proceeding further with the brief description of this feature of the device, the radiator may be employed in the summer time in an apparatus used in a dwelling house as a means for cooling the air passing through the apparatus, ice water being in this case passed through the radiator. When used thus, or when used in connection with a refrigerating room, the radiator may also serve as a de-humidifying medium to condense excess moisture from the air passing through the apparatus.

Another object of my invention is to provide the simple, compact apparatus briefly described above embodying a housing, the lower region of which is imperforate so as to constitute a water collection tank or pan, means being provided for recirculating the excess water which drains away from the air moistening means so that it is again available to the device which spreads the water over the moistening partition.

A further object is to provide automatic controls for,

1. The moistening device,
2. The radiator and heat supplying means, and
3. The radiator and cooling-fluid means, whereby both temperature and humidity may be automatically maintained at a predetermined level.

A further object is to provide a control system for three separate means just specified, the control system embodying the use of only two primary control instruments, i. e., a moisture responsive electric switch, and a thermostat.

A further object is to provide an arrangement including the recirculating system for saving water in combination with a primary source of water supply and control means for automatically using the water from the primary source of supply when the collected water within the housing has fallen below a predetermined level.

A still further object is to provide an apparatus which may be arranged so as to function with or without the recirculating apparatus, and to provide an arrangement wherein the humidity control device will open either to control the recirculating means or to control the primary source of supply.

A further object of my invention is to provide in an apparatus having the humidifying, de-humidifying, heating and cooling functions above mentioned, a full automatic system of controls such that the apparatus will maintain when desired, predetermined temperature and humidity levels under the most widely varying natural atmospheric conditions which will be met with in any of the environments above specified. For instance, in an ordinary dwelling house, in the summer time, the temperature will range through the various levels of 60, 75, and 85° at the periods of morning, noon, and evening with corresponding relative humidity levels of 80, 55, and 35% respectively, while in the winter time at the same periods, the outside atmospheric temperature will for example, range through the successive levels of 0, 10, and 30° with corresponding relative humidity levels of 90, 75, and 60%, while within the dwelling, in the winter time at the same periods, the relative humidity will range through the respective levels of 25, 30, and 15%.

My invention, under these conditions would maintain, winter and summer, a constant, predetermined temperature and humidity.

With these and other objects in view, my invention consists in the construction, arrangement, and combination of the various parts of my device, whereby the objects contemplated are attained, as hereinafter more fully set forth, pointed out in my claims, and illustrated in the accompanying drawing, in which:

The figure illustrates a perspective view of the apparatus in combination with a wiring diagram illustrating the control apparatus, a portion of the apparatus housing being broken away to illustrate the interior construction.

Referring more particularly now to the drawing, the housing has a bottom wall which is not illustrated and side walls 10, end walls 11, and a top wall 12 soldered or welded together to form a liquid-tight structure. An inlet opening 13 is formed in one of the end walls 11 and a discharge opening in the top wall 12 communicates with the discharge duct 14 which carries the conditioned air from the apparatus to the region of use. An electric motor 15 drives a fan 16 which creates a current of air through the housing from the inlet opening 13 to the discharge duct 14. The fan 16 may be mounted by a spider 17 of the conventional ventilator fan construction so as to be substantially centered in or directly behind the opening 13.

Since the fan 16 operates constantly during the operation of the apparatus, no current supply system for the motor 15 is illustrated.

A pair of perforated partition walls 18 extend from top to bottom and from side to side of the housing, being disposed in transverse positions within the housing and thus completely traversing the column of space extending from one end to the other of the housing.

Thus the air stream from the fan 16 is forced, all of it, to pass through, in turn, the respective partition walls 18.

The partition walls 18 are preferably embodied in sheets of woven wire, although it will be understood that any equivalent, such as perforated sheets of metal or louvers, may be employed.

A baffle wall 19 is secured to the top wall 12 and depends between the partition walls 18 and the discharge duct 14. This baffle serves to retard droplets of water from passing out through the duct 14.

An electro-magnetic valve 25 in the water supply pipe 24 controls the flow of city water to the apparatus. Since electro-magnetically operated valves are commonly known and used, the construction of the valves used in this apparatus is not illustrated, it being understood that any standard form of construction may be employed wherein a valve is operated by an electro-magnet.

A water pump 26 is driven by an electric motor 27, the discharge end of the pump communicates with the water supply pipe 24 by means of a pipe 28, and the intake side of the pump communicates through a pipe 29 with the lower imperforate region of the housing.

Any conventional electric motor-pump unit may be employed for this purpose, somewhat as illustrated.

A heating fluid supply system includes the intake pipe 30, controlled by an electro-magnetic valve 31, and a discharge pipe 32, controlled by an electro-magnetic valve 33.

The valves 31 and 33 are in turn controlled in parallel by a thermostat 34, so that when the temperature falls below a predetermined point, the valves will simultaneously open to allow circulation of a heating fluid through the radiator and so that when the temperature rises above a predetermined level, the valves will simultaneously close to shut off the flow of heating fluid and to provide a closed circuit for the flow of cooling fluid as will be more clearly described in the next paragraph. From a suitable source of current, such as a power line L, current is supplied through the wires 35 and 45 when the circuit including the wires 35 and 45 and the electro-magnets of the valves 31 and 33 in parallel, is closed by the thermostat 34.

The cooling fluid circuit includes the inlet pipe 36, communicating with the pipe 30 and with the discharge side of a cold water pump 37, and a return pipe 38 communicating with the pipe 32 and with a water cooler, which is not illustrated in the drawing.

Any type of refrigerating unit, such as the modern electric refrigerator, or an ice cooler, can be employed in connection with the apparatus. Water from the refrigerating unit is taken from the pipe 39 to the inlet side of the pump 37.

An electric motor 40 drives the pump 37 and the two may be embodied in a water pump unit similar to the one for recirculation.

Where an abundance of water is to be had, the recirculating apparatus may be dispensed with and the water allowed to overflow from the housing, through the overflow pipe 41.

Where the cost of the water is a material item in the operation of the device however, the water may be used over and over again, employing the recirculation apparatus.

It will be seen however, that as the water is used in supplying moisture to the air passing through the apparatus, it will be necessary to frequently replenish the supply of water within the housing. For this purpose, I provide a float operated switch 42 which controls the valve 25. The float which in turn controls the switch 42 is shown at 43, and the float and switch assembly are of the conventional construction not requiring illustration. My invention requires only that the float 43 close the switch when it drops below a predetermined level thus energizing the circuit controlling the valve 25 and opening the valve to allow water to flow through the valve into the housing. The pump 26 is a centrifugal pump.

When the valve 25 is closed, and the pump 26 is operating, the water urged through the pipe 28 by the pump can find but one outlet and that through the spray nozzles 22.

It is immaterial whether the make-up water from the source of supply enter the housing through the nozzles 22 or through the pump 26. Ordinarily, the switch 42 will only be operated while the pump 26 is withdrawing water from the housing, and consequently the make-up water from the source of supply will enter the housing only at a time when the apparatus is raising the humidity of the air passing through it. Thus there will be no unbalancing of the apparatus by the humidifying action of the water which could occur if make-up water were sprayed through the nozzles at a time when the humidity was at or above the desired level.

When the recirculating apparatus is not used, water is taken from the source of supply through the valve 25 which in this case is controlled by a moisture responsive switch 44. This switch is constructed according to the disclosure of my application Serial No. 449,523, filed May 3, 1930, for Moisture Responsive Instrument.

The switch 44 includes a switch arm having a neutral open position and two closed positions, one of which is induced by an excess of humidity and the other of which is induced by a deficiency of humidity.

The switch takes current from the current supply source L through the wire 45, and delivers it from one of its positions through a wire 46 to the wire 47 which carries current to the valve 25. This position of the switch is the one which is induced by a deficiency of humidity, and in this position, the switch will deliver current to the motor 27, through a wire 48.

Wires 49 and 50 respectively lead back from the valve 25 and motor 27 to the source of current L.

Since the valve 25 is never controlled by a moisture responsive switch 44, in the same arrangement wherein the motor 27 is controlled by the moisture responsive switch, the respective circuits from the moisture responsive switch to the valve and motor are shown separated by hand-switches 51 and 52. The showing is made in this manner in order that the drawing may include a disclosure of both arrangements.

To be more specific, the drawing shows a combination of two separate and distinct circuits, one of which is employed where the recirculation apparatus is used and the other of which is employed where the recirculation apparatus is not used, and the switches 51 and 52 are merely a means for illustrating both of the circuits on a single wiring diagram. Neither of the switches would be used in an actual installation, that portion of the circuit which is cut out by either switch being omitted in one or the other of the installations.

For instance, in the drawing, the switches are arranged so as to indicate closed, that circuit wherein the recirculation apparatus is not employed.

Tracing in detail the operation of the various controls in this arrangement, it will be assumed that the humidity in the air being conditioned by the apparatus has just fallen below the predetermined level to which it is to be maintained. The humidity controlled switch 44 will then function to close the circuit including the wire 46, the switch 51, the wire 47, the valve 25, the wire 49, the line circuit L, and the wire 45.

The valve 25 will then allow water to spray from the nozzles 22, increasing the humidity until the moisture responsive switch 44 returns to neutral position, breaking the circuit just traced and allowing the valve 25 to close. The water jets will then cease and the air passing through the apparatus will take up very little moisture from the apparatus.

Assuming that the moisture content has increased beyond the desired level, the moisture responsive switch 44 will throw into its opposite position from that just described, establishing a circuit through the wire 53, the motor 40, the wire 54, the line circuit L, and the wire 45. Cold water from the source of cold water supply will then be pumped into the pipe 30 and 32, and through the radiator 20, the valves 31 and 33 being closed so as to direct the cold water through the radiator. An explanation of why valves 31 and 33 will never be open while the cold water circulation system is functioning will be given hereinafter.

The cooling of the radiator by the cold water flowing through it will condense moisture from the atmosphere passing through the apparatus and will decrease the humidity.

At the same time, the air will be cooled, and since excessive humidities are only present in the summer time during hot weather, the apparatus will serve as a cooling medium, the cooling being controlled by excessive humidity.

Proceeding now to the second arrangement in which the recirculation apparatus is employed, it will be necessary to imagine the closing of the switch 52 and the switching over of the switch 51 to close the circuit including the wire 55. The circuit will then no longer include the control of the valve 25 from the humidity responsive instrument 44, and in this circuit the valve will be controlled by the float switch 42.

Assuming now that the humidity has fallen below the proper level, the humidity responsive switch 44 will complete the circuit through the wire 46, the switch 52, the wire 48, the motor 27, the line circuit L, and the wire 45, causing the pump 26 to be operated to pump water from the body of water A through the pipe 28 and to the nozzles 22.

In this arrangement, when the humidity increases above the proper level, the moisture responsive switch 44 will complete the circuit through the cooling control apparatus in the same manner as already described for the other arrangement.

When the water within the housing has fallen below its proper level, the switch 42 will close the circuit including the wire 55, the switch 51, the wire 47, the valve 25, the wire 49, the line circuit L, the wire 45, and the wire 56.

The valve 25 will then be opened to allow make-up water to bring the level of the body of water A back to proper height.

The thermostat 34 will be used only during the colder months of the year and during the hot months, it will at all other times remain inoperative. During the colder months, the relative humidity existing in closed, heated spaces will be exceedingly low, and it will be impossible for the humidity to increase above the level for which the apparatus is set, and therefore impossible for the cold water circulating system to be thrown into operation while the valves 31 and 33 are open.

Should the temperature of the air being conditioned fall slightly below the desired temperature, the thermostat 34 will operate to close the circuit through the wire 35, the valves 31 and 33, the line circuit L, and the wire 45, opening the valves and allowing heat from a heating system to flow through the radiator 20, thus raising the temperature of the air flowing through the apparatus to supplement the action of the heating plant for the dwelling house or other structure in which the apparatus is located.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In an air conditioning apparatus, a housing provided with inlet and discharge openings, means to create a current of air through the housing from one opening to the other, a radiator interposed between the openings and adapted to produce either a heating or cooling effect on the air passing therethrough, means for supplying heating and cooling fluids to said radiator, a thermostatic control for the heating fluid supply means, and a moisture responsive control for the cooling fluid supply means.

2. In an air conditioning apparatus, a housing provided with inlet and discharge openings, means to create a current of air through the housing from one opening to another, a radiator interposed between said openings, a source of heating fluid, electrically actuated means for admitting the heating fluid to the radiator, a source of refrigerating fluid, electrically actuated means for admitting the refrigerating fluid to the radiator, a temperature responsive electric means for controlling the first said electrically actuated means, and a humidity responsive means for controlling the latter said means.

3. In an air conditioning apparatus, a housing provided with inlet and discharge openings, means to create a current of air from the inlet to the discharge opening, a radiator interposed between the openings, a feed pipe to carry a cooling fluid to the radiator, air moistening means in the housing, a motor-driven pump for feeding a cooling fluid through said feed pipe, and a moisture responsive switch controlling said motor-driven pump.

4. In an air conditioning apparatus, air moistening means, means to collect excess moisture therefrom, a water supply pipe to feed said moistening means, a pump, a pump line including the pump and communicating with said collecting means and with said supply pipe, a moisture responsive switch controlling the operation of said pump.

5. In an air conditioning apparatus, a housing wherein water is absorbed by air passing therethrough, a water supply pipe to feed water to the housing, a pump, a pump line including the pump and communicating with the lower region of the housing and with said supply pipe, a moisture responsive switch controlling the operation of said pump.

6. In an air conditioning apparatus, a housing provided with inlet and discharge openings, air moistening means in the path of air currents flowing through the housing from one opening to the other, a water supply pipe to feed said means, a pump, a pump line including the pump and communicating with the lower region of the housing and with said supply pipe, a moisture responsive switch controlling the operation of said pump.

7. In an air conditioning apparatus, a housing provided with inlet and discharge openings, means for creating a current of air through the housing from one opening to the other, air moistening means in the housing, a water supply pipe to feed said means, a pump, a pump line including the pump and communicating with the lower region of the housing and with said supply pipe, a moisture responsive switch controlling the operation of said pump.

8. In an air conditioning apparatus, air moistening means, means to collect excess moisture therefrom, a water supply pipe to feed water to said moistening means, a pump, a pump line including the pump and communicating with said collecting means and with said supply pipe, a moisture responsive switch controlling the operation of said pump, an electro-magnetic valve controlling the admission of water to said supply pipe and a float operated switch controlling said valve.

9. In an air conditioning apparatus, a housing provided with inlet and discharge openings, air moistening means in the path of air currents flowing through the housing from one opening to the other, a water supply pipe feeding said moistening means, a pump, a pump line including the pump and communicating with a lower region of the housing and with said supply pipe, a moisture responsive switch controlling the operation of said pump, an electro-magnetic valve controlling the admission of water to said supply pipe and a float operated switch controlling said valve.

10. In an air conditioning apparatus, a housing provided with inlet and discharge openings, means for creating a current of air through the housing from one opening to the other, air moistening means in the housing, a water supply pipe feeding said moistening means, a pump, a pump line including the pump and communicating with a lower region of the housing and with said supply pipe, a moisture responsive switch controlling the operation of said pump, an electro-magnetic valve controlling the admission of water to said supply pipe and a float operated switch controlling said valve.

11. In an air conditioning apparatus, a housing provided with inlet and discharge openings, a water supply pipe, air moistening means in the housing fed by said supply pipe, an electro-magnetic valve controlling the supply pipe, a moisture responsive switch controlling the valve, means to create a current of air through the housing from inlet to discharge opening, a radiator interposed between said openings, a feed pipe to carry a heating fluid to said radiator, an electro-magnetic valve controlling said feed pipe and a thermostat to control said last mentioned valve.

12. A humidifying apparatus comprising a humidifying element, a water discharge passage thereto, a water collector below the element, constituting a reservoir, a source of water, a water pump feeding from the reservoir and discharging to the passage, the source of water communicating with the passage intermediate the element and the pump, a valve between said source and said communication, a flow control switch responsive to the water level in the reservoir for controlling the valve, and a humidity responsive control device for the pump.

HOBART B. HOWRY.